United States Patent [19]
Eagan et al.

[11] Patent Number: 5,167,773
[45] Date of Patent: Dec. 1, 1992

[54] DISTILLATION TOWER AND SIDESTREAM STRIPPER THEREFOR

[75] Inventors: James D. Eagan, Surrey, Great Britain; Adrianus Welmers, Ontario, Canada

[73] Assignee: Exxon Research and Engineering Co., Florham Park, N.J.

[21] Appl. No.: 465,822

[22] Filed: Jan. 16, 1990

[51] Int. Cl.[5] .................. B01D 3/16; C10G 7/06
[52] U.S. Cl. .................... 202/158; 202/154; 202/198; 202/205; 202/234; 196/100; 196/114; 196/127; 196/139; 203/76; 203/77; 203/87; 203/93; 203/DIG. 19; 203/DIG. 14; 203/DIG. 9; 208/355; 208/356; 208/357; 208/364
[58] Field of Search ............... 202/154, 158, 234, 205; 203/DIG. 19, 99, 75, 76, 77, 93, 92, 95, 96, 97, DIG. 14; 208/354, 355, 356, 363, 364, 357, 366; 196/100, 114, 127, 139

[56] References Cited

U.S. PATENT DOCUMENTS

| | | | |
|---|---|---|---|
| 2,009,079 | 7/1935 | Burkhard | 196/94 |
| 2,054,777 | 9/1936 | Ward | 196/94 |
| 2,057,004 | 10/1936 | Burkhard | 196/94 |
| 2,071,909 | 2/1937 | Watt | 196/94 |
| 3,310,487 | 3/1967 | Johnson et al. | 208/355 |
| 3,365,386 | 1/1968 | Van Pool | 208/41 |
| 3,402,124 | 9/1968 | Jones | 208/353 |
| 3,567,628 | 3/1971 | Van Pool | 203/DIG. 19 |
| 4,025,398 | 5/1977 | Haselden | 203/DIG. 19 |
| 4,394,219 | 7/1983 | Mix et al. | 203/1 |
| 4,415,443 | 11/1983 | Murphy | 208/355 |
| 4,662,995 | 5/1987 | Lipkin et al. | 208/355 |
| 4,702,819 | 10/1987 | Sharma et al. | 208/355 |

Primary Examiner—Wilbur Bascomb, Jr.
Attorney, Agent, or Firm—Joseph J. Allocca

[57] ABSTRACT

A distillation tower (1) has a plurality of liquid sidestream lines (5, 6, 7) and a multi-stage sidestream stripper (13) which includes a respective stripping section (14, 15, 16) for each sidestream line housed in a common, upright, cylindrical shell (28) which allows vapor to pass freely from each stage to the one above. Partial vaporization of each sidestream is achieved by applying a vacuum to the top of the stripper shell (point 21) and/or introducing strip gas at the bottom (point 20). Because the vapor passes serially through the stripping sections from the bottom of the stripper (13) to the top, the need to supply strip gas separately to the stripping sections and/or apply vacuum individually is avoided. The separation between the sidestream products is improved by including, in each stage, a rectification zone (22, 23, 24) positioned above the stripping section.

8 Claims, 2 Drawing Sheets

DISTILLATION TOWER AND SIDESTREAM STRIPPER THEREFOR

BACKGROUND OF THE INVENTION

This invention relates to a fractionation tower and sidestream stripper therefor.

Many distillation processes, such as atmospheric and vacuum distillation of crude oils, produce multiple sidestream products. Often, such sidestreams are stripped in respective strippers using steam, with the steam and stripped-out vapors being discharged into the main distillation tower at or above the point where the sidestream is withdrawn. For convenience of layout and compactness, the strippers for two or more sidestreams are often stacked on top of each other in one shell. However, no fluid connection exists between the strippers, so that each has its own individual strip gas supply and exit points.

The purpose of each stripper is to remove light components from the sidestream product and thus to improve the separation between neighboring sidestreams. However, in practice the stripping process is not very selective and, even with a large amount of steam and a large number of theoretical stages, only moderate improvements in the separation between sidestreams can be made.

It would be desirable to simplify the constructural arrangement and/or improve the operational efficiency of distillation processes.

DESCRIPTION OF THE PRIOR ART

U.S. Pat. Nos. 2,009,079 and 2,057,004 (both M. J. Burkhard) and U.S. Pat. No. 2,071,909 (E. Watt) disclose a fractionator for the distillation of hydrocarbons, having only a single sidestream and single associated stripper.

U.S. Pat. No. 2,054,777 (J. T. Ward) discloses an upright shell including a stack of sidestream strippers, each acting to strip a respective sidestream product. Ward does not explicitly state whether or not the strippers are in fluid communication with one another or explicitly describe how strip gas is supplied, but FIG. 1 appears to show a separate strip gas supply pipe mounted in the bottom region of each stripper. It would appear that the strippers are separate vessels. Furthermore, none of the strippers is provided with a rectification zone in the upright stripper shell.

In U.S. Pat. No. 3,310,487 (F. E. Johnson et al.), a fractionation system includes a sidestream stripper in which respective sidestreams from a fractionation tower are stripped in respective strippers. These strippers are arranged one above another and constitute an upright multi-compartmented stripper, each compartment containing an individual sidestream stripper. Overhead vapors from each stripper are separately returned to the fractionation tower. No rectification zones are employed in the multi-compartmented stripper.

A single stripping tower having two sidestream feeds from a distillation column is disclosed in U.S. Pat. No. 3,365,386 (J. Van Poole). No strip gas is used in the stripping tower. Instead, stripping is effected by a steam coil and vapors generated in the tower are returned to the distillation column by an overhead vapor line.

In U.S. Pat. Nos. 3,402,124 (W. T. Jones), a primary distillation column has a single sidestream which is stripped in a side-cut distillation column or stripper. Jones refers to the possibility of employing multiple side-cut strippers, but does not teach or indicate how they would be used. In particular, Jones makes no reference to interconnecting the strippers in a way such that overhead strip gas and vapors from one stripper would pass freely within a common, upright, stripper shell to the next stripper above. Again also, no rectification zones are mentioned.

Finally, reference is made to U.S. Pat. No. 4,415,443 (Murphy), in which the bottoms from the primary column of a twin distillation column embodiment, having a stripping zone and a rectification zone in each column, is fed to the stripping zone of the second column. Overflash from the rectification zone of the first column is fed as a sidestream to the rectification zone of the second column. No primary column sidestream is fed to the stripping zone of the second column and the second column contains only a single stripping zone. The Murphy patent also refers to the use of additional columns in a general sense, but no description is given as to whether, and if so how, to interconnect the additional columns.

SUMMARY OF THE INVENTION

In the present invention, a distillation tower has a plurality of sidestream lines and a multi-stage stripping apparatus. According to the invention, each stage comprises a stripping section, associated with a respective sidestream line, and a rectification zone above the stripping section, and the stages are housed one above another in a common upright, e.g. cylindrical, shell which permits overhead vapor (and any strip gas) from each stage to pass, upwardly within the common shell, to the stage above. The function of the stripping section is to remove light components of the liquid sidestreams by vaporization. The function of each rectification zone is to remove heavy components from the overhead vapor from the associated stripping section, and this function is achieved by obtaining partial condensation of the vapor. This condensation can be achieved by including an internal cooling device in each rectification zone. A side-stream line containing a lighter sidestream may be connected to the internal cooling device so that the lighter sidestream is used as coolant for the internal cooling device. In one preferred arrangement, at least one stripping section is arranged to allow liquid product to spill over onto the rectification zone below, in order to provide reflux for that rectification zone.

Stripping can be produced by applying vacuum to the top of the common stripper shell above the uppermost stage and/or by feeding strip gas to the shell at a point below the bottom-most stage. This arrangement, in which in effect the discharge strip gas and vapor from a higher boiling sidestream are used as strip gas for a lower boiling sidestream, results in a simple, effective and compact layout.

A vertical arrangement of the stripper in one shell assists the free passage of vapor between stages.

In one embodiment, the discharged vapor (and strip gas) from the top of the common shell is returned to the top of the distillation tower.

BRIEF DESCRIPTION OF THE DRAWINGS

For a better understanding of the invention and to show how the same may be carried into effect, reference will now be made, by way of example, to the accompanying drawings, in which.

DETAILED DESCRIPTION OF THE INVENTION

Figure 1:
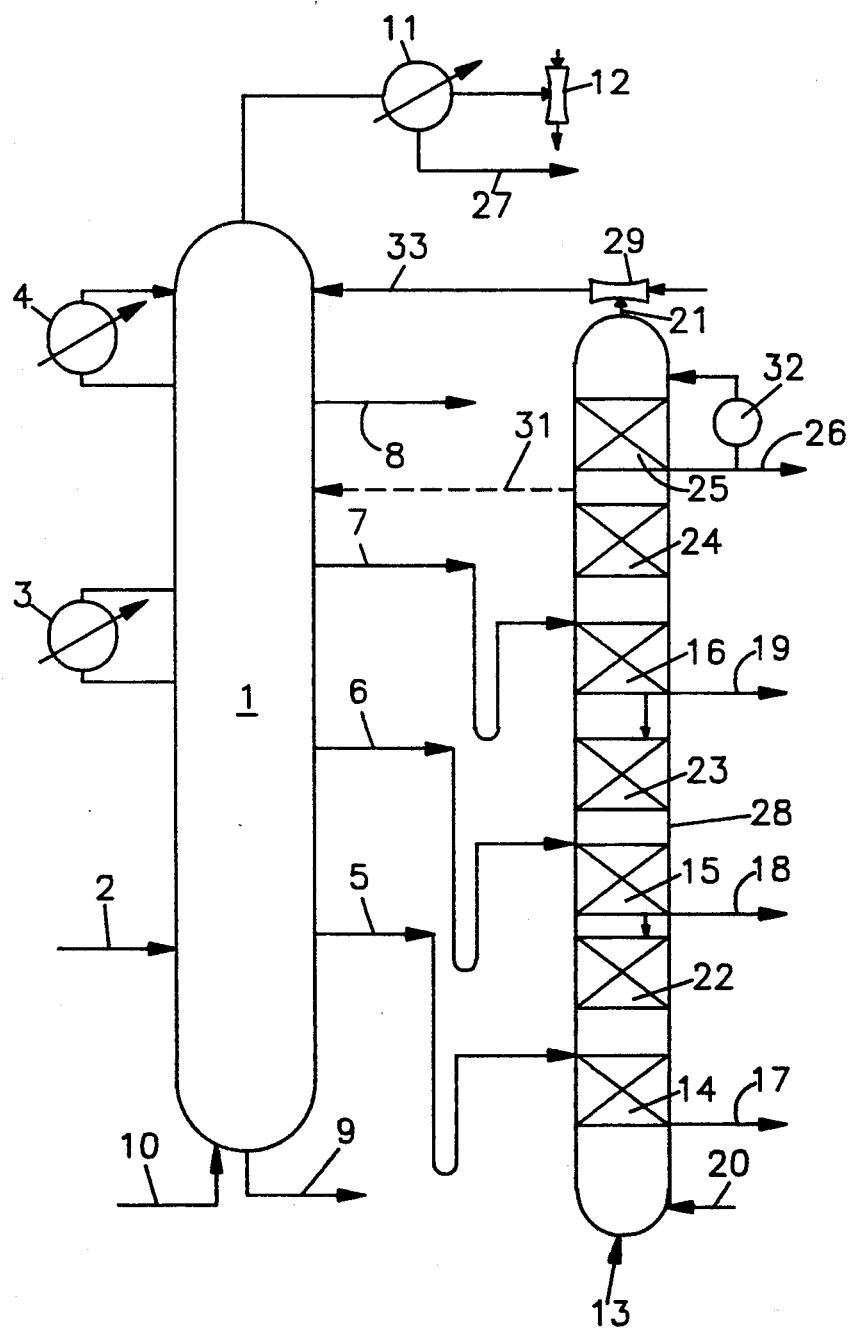
FIG. 1 diagrammatically illustrates a preferred embodiment of the invention, comprising a fractionation tower and stripping apparatus.

FIG. 1 illustrates a vacuum distillation tower 1 such as used for the production of lubricant feedstocks from crude oil, as an example. The main tower 1 contains a feed point 2 near the bottom of the tower, two heat removal, pumparound sections 3, 4 to provide reflux, and four sidestream lines 5, 6, 7, 8. Although four sidestream lines are shown in FIG. 1, the number of sidestream lines employed is not significant and may be greater or less than four according to requirements. As will be described in more detail hereafter, three of the sidestream lines 5, 6, 7 are connected with respective sidestream stripping sections 14, 15, 16 of a stripper 13. The top sidestream product in line 8 is normally not stripped. The bottoms product 9 of the main tower is typically stripped with steam 10 in the bottoms section 25 of the tower. Most vapors and most steam leaving the main tower are condensed at point 11, the condensate passing along line 27, and a vacuum is applied to the top of the tower by equipment at point 12.

FIG. 1 shows that each sidestream line 5, 6, 7 is connected to introduce the sidestream into the top of the associated stripping section 14, 15, 16. The stripper 13 comprises a common, upright, cylindrical shell 28 having a strip gas (e.g. steam) feed point 20 below the bottom-most stripping section 14 and a vacuum point 21 at the top of the shell, to which vacuum is applied by vacuum system 29. The effect of applying vacuum to the top of the common shell 28 at point 28 and feeding strip gas to feed point 20 near the bottom of the stripper 13, coupled with the use of the common shell 28, is to cause overhead vapor and strip gas from each stripping section 14, 15, 16 to freely pass upwardly to the next section above (15, 16, 25). Thereby, strip gas and vapor pass serially through the stripping sections from the bottom to the top of the stripper 13. Preferably as shown, the vapor and strip gas discharged from the top of common shell 28 is returned, by vacuum system 29, to the top of the distillation tower 1 along return line 33.

Part of the sidestreams entering each stripping section is vaporized though most of the liquid is withdrawn from the bottom of each stripping section as the final product withdrawn along product line 17, 18, 19. Each stripping section could contain trays, randomly dumped packing or structured packing to accomplish contact between liquid and vapor. All such arrangements per se are well known in the art and need not be further described herein. Liquid entering at the top of each stripping section is distributed by well known means such as a weir-trough, or an orifice tray (when the stripping section comprises packing), or on the top tray itself (in a trayed-stripper). Partial vaporization of the sidestreams 5, 6, 7 can be accomplished by using strip gas (e.g. steam) at point 20, or by applying a vacuum at point 21, or by a combination of vacuum and strip gas.

In addition to housing the stripping sections, the stripper shell 28, preferably as shown, additionally houses three fractionation beds or rectification zones 22, 23, 24, each associated with, and located above and spaced from, a respective stripping section 14, 15, 16. It will be appreciated that the stripping sections and rectification zones are organized in three pairs or stages, located one above another and each comprising a stripping section 14, 15, 16 and a rectification zone 22, 23, 24 positioned above the stripping section.

Figure 2:
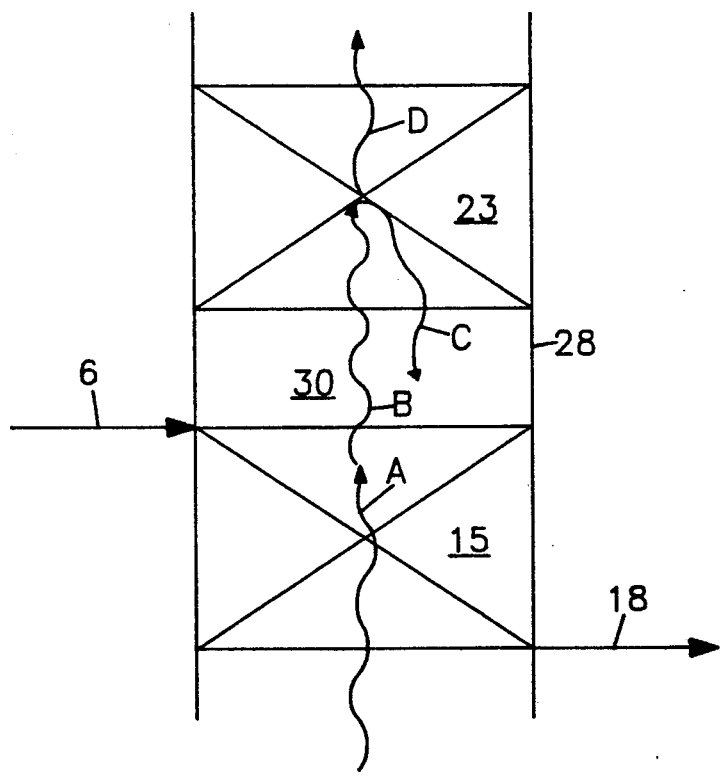
FIG. 2 is a diagrammatic representation, on an enlarged scale, of a stripping section and associated rectification zone, included in the stripping apparatus shown in FIG. 1.

FIG. 2 is an enlarged view of one stripper/rectifier stage, which is shown as comprising stripping section 15 and rectification zone 23 although the mode of operation is the same for all stripper/rectifier pairs. With particular reference to FIG. 2, light product vapor (and any strip gas) from the stage below (or strip gas entry point in the case of bottom stripping section 14) passes through stripping section 15, as indicated by arrow A. The strip gas and/or low pressure, acting in the region 30 between stripping section 15 and rectification zone 23 due to the application of vacuum to the top of stripper shell 28, effects partial vaporization of sidestream 6, so that vapor of light and heavy products pass upwardly through region 30, as indicated by arrow B, while final liquid product leaves stripping section 14 along line 18.

The vapors leaving the stripping sections 14, 15, 16 enter the fractionation beds 22, 23, 24 from below. In these rectification sections, the heaviest part of the vapor is condensed (hence these sections are referred to as rectification zones) and is returned to the next lower stripping bed 15 (arrow C). The lower boiling part of the vapor passes through the rectification bed 23 (arrow D) and will be mainly condensed in the next higher stripping zone 16 and thus will be added to the next lighter sidestream 7. The vapor passing through rectification bed 24 can be condensed in bed 25 and withdrawn as a product along product line 26 or, alternatively, the vapor can be discharged into the main tower, along return line 31, to a point located a short distance above the entry point of sidestream line 7. The heat removal to obtain condensation in the rectification beds can be accomplished in several ways, such as by providing cooling coils in or above the beds (possibly using a lighter and thus cooler sidestream as the coolant), by using external heat removal such as shown for bed 25 in the form of external condenser 32, or as is indicated in FIG. 1 for beds 22 and 23 by vertical arrows, by allowing some cooler liquid from a lighter sidestream 18, 19 to spill over onto these beds 22, 23 and provide reflux for these rectification zones. The rectification sections 22, 23, 24 may contain trays, randomly dumped packing or structured packing, to accomplish contacting between liquid and vapor.

The largest improvements in separation between sidestreams can be expected when most or all of the features described above are applied. However, an improvement could be obtained by combining the stripping of several sidestreams in one stripper, as disclosed herein, but without using the reduction in operating pressure in the stripper and/or without using the rectification zones.

Finally, although FIG. 1 illustrates a vacuum distillation main tower, the features disclosed herein would also be applicable to distillation processes at atmospheric or elevated pressure in the main tower.

What is claimed is:

1. In combination a distillation tower, having a plurality of liquid sidestream lines, and multi-stage liquid stripping apparatus, each stage comprising (i) a stripping section, associated with a respective sidestream line, and (ii) a rectification zone above the stripping section of that stage for condensing higher boiling point components of vapor passing upwardly through the rectification zone, the stages being housed one above another in a common upright shell permitting overhead vapor from each stage to pass upwardly within the common shell, to the stage above and condensate from each stage to pass, downwardly within the common shell, to the stage below.

2. A combination as in claim 1, wherein a vacuum system is provided which applies a vacuum to the multi-stage stripping apparatus through a location in the common shell of said multi-stage stripping apparatus above the uppermost stage.

3. A combination as in claim 1, wherein a stripping gas entry line is provided at the bottom of the common shell below the bottommost stage of said stripping apparatus.

4. A combination as in claim 2, wherein a stripping gas entry line is provided at the bottom of the common shell below the bottom-most stage of said stripping apparatus.

5. A combination as in claim 1, wherein each rectification zone includes an internal cooling device for effecting partial condensation of vapor from the next stripping section below.

6. A combination as in claim 5, wherein a liquid sidestream line containing a lighter liquid sidestream is connected to said internal cooling device so that said lighter liquid sidestream is used as coolant for the internal cooling device.

7. A combination as in claim 1, wherein each stripping section is arranged to allow liquid product to spill over onto the rectification zone below in order to provide reflux for that rectification zone.

8. A combination as in claim 3, wherein a vacuum generating device is connected to said vacuum point to apply vacuum to the top of the common shell and a return line, connected between the top of the distillation tower and the discharge side of the vacuum generating device, is arranged to return discharged vapor and strip gas from the top of said common shell to the distillation tower.

* * * * *